(12) United States Patent
George et al.

(10) Patent No.: US 6,255,010 B1
(45) Date of Patent: Jul. 3, 2001

(54) SINGLE MODULE PRESSURIZED FUEL CELL TURBINE GENERATOR SYSTEM

(75) Inventors: Raymond A. George, Pittsburgh; Stephen E. Veyo, Murrysville; Jeffrey T. Dederer, Valencia, all of PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/356,919

(22) Filed: Jul. 19, 1999

(51) Int. Cl.$^7$ .................................................... H01M 8/10
(52) U.S. Cl. ................................ 429/30; 429/12; 429/13; 429/17; 429/22; 429/25; 429/31; 429/34; 429/53; 429/57; 429/30
(58) Field of Search ................................ 419/12, 13, 17, 419/22, 25, 30, 31, 34, 53, 57

(56) References Cited

U.S. PATENT DOCUMENTS

| | | |
|---|---|---|
| 3,748,180 | 7/1973 | Clausi et al. . |
| 5,413,879 | 5/1995 | Domeracki et al. .................... 429/30 |
| 5,541,014 | * 7/1996 | Micheli et al. ......................... 429/19 |
| 5,573,867 | 11/1996 | Zafred et al. . |
| 5,750,278 | 5/1998 | Gillett et al. . |
| 5,851,689 | 12/1998 | Chen . |
| 5,968,680 | * 10/1999 | Wolfe et al. ............................ 429/13 |

FOREIGN PATENT DOCUMENTS

WO 98/29918    7/1998   (WO) .

OTHER PUBLICATIONS

"Solid Oxide Fuel Cell . . . Power Generation of the Next Decade"; *Westinghouse Electric Corp.*, Brochure 1992.
"Fuel Cells Make Their CPI Moves"; *Chemical Engineering*, (B.R. Gilbert et al.; Aug. 1995, pp. 92–96).
"Molten–Carbonate Fuel Cell Demonstrates its Commercial Readiness"; *Power Engineering*; (S.E. Keuhn, Mar. 1995, p. 16).

\* cited by examiner

*Primary Examiner*—Gabrielle Brouillette
*Assistant Examiner*—Dah-Wei Yuan

(57) ABSTRACT

A pressurized fuel cell system (10), operates within a common pressure vessel (12) where the system contains fuel cells (22), a turbine (26) and a generator (98) where preferably, associated oxidant inlet valve (52), fuel inlet valve (56) and fuel cell exhaust valve (42) are outside the pressure vessel.

12 Claims, 1 Drawing Sheet

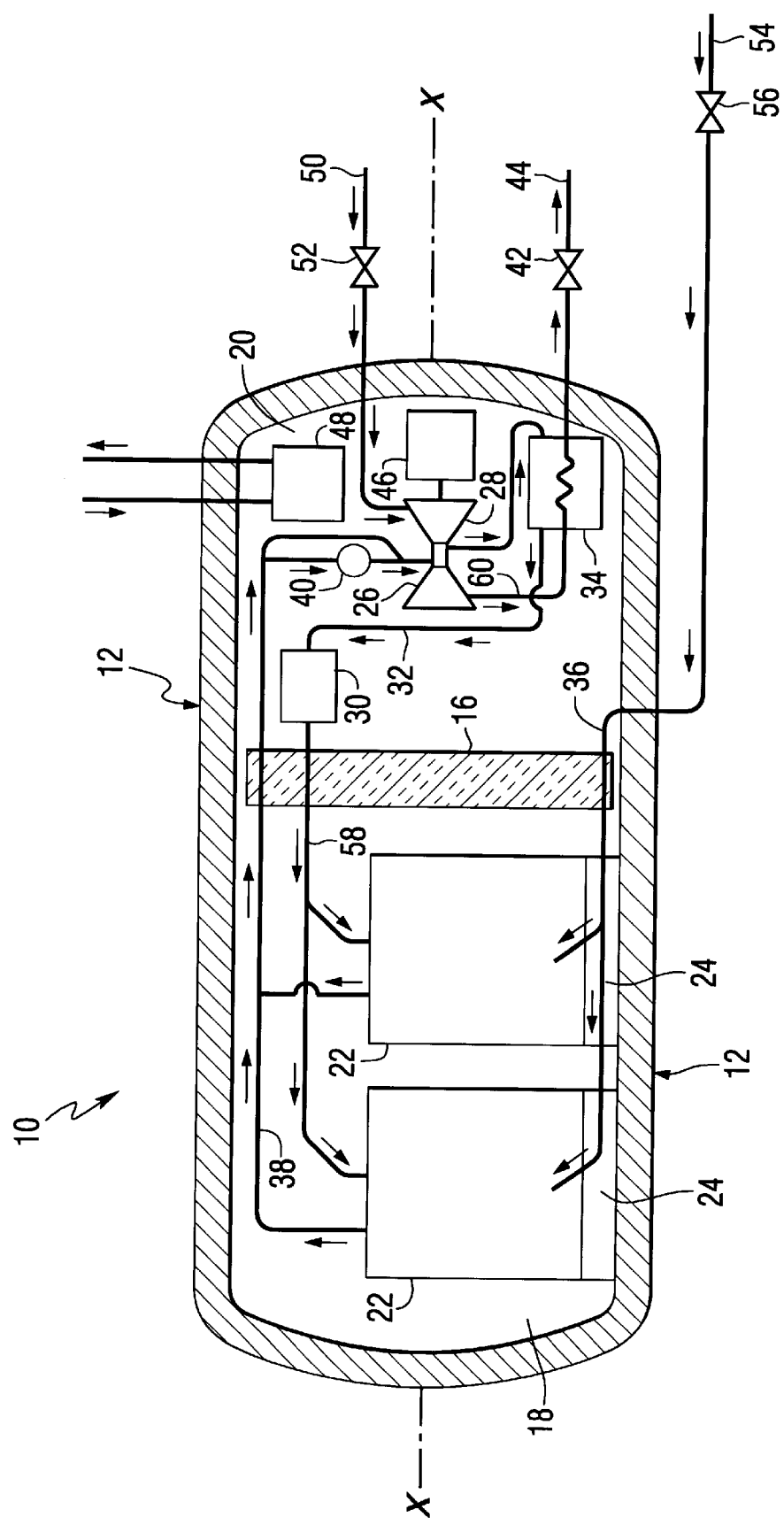

SINGLE MODULE PRESSURIZED FUEL CELL TURBINE GENERATOR SYSTEM

GOVERNMENT CONTRACT

The Government of the United States of America has rights in this invention, pursuant to Contract No. DE-AC26-98FT40355 with the United States Department of Energy.

BACKGROUND OF THE INVENTION

1. Field of the Invention

This invention relates to pressurized operation of fuel cells including an associated gas turbine generator within the pressure vessel.

2. Background Information

Fuel cell based, electrical generator apparatus utilizing solid oxide electrolyte fuel cells ("SOFC") arranged within a housing and surrounded by insulation are well known for tubular, flat plate, and "corrugated" SOFC. The tubular type fuel cells can comprise an open or closed ended, axially elongated, ceramic tube air electrode material, which may or may not be deposited on a ceramic support tube, completely covered by thin film ceramic, solid electrolyte material, except for a thin, axially elongated, interconnection material. The electrolyte layer is covered by cermet fuel electrode material. Other tubular designs can be configured with multiple cells per single tube, cathode supported, anode supported, support tube (ceramic or metallic) supported and with the exterior surface being either the anode or the cathode. The flat plate type fuel cells can comprise a flat array of electrolyte and interconnect walls where electrolyte walls contain thin, flat layers of cathode and anode materials sandwiching an electrolyte. The "corrugated" plate type fuel cells can comprise a triangular or corrugated honeycomb array of active anode, cathode, electrolyte and interconnect materials. Other fuel cells not having a solid electrolyte, such molten carbonate fuel cells are also well known, and can be utilized in this invention.

Development studies of SOFC power plant systems have indicated the desirability of pressurized operation, as taught in "Solid Oxide Fuel Cell . . . Power Generation of the Next Decade", Westinghouse Electric Corporation, Brochure 1992. This would permit operation with a coal gasifier as the fuel supply and/or use of a gas turbine generator as a bottoming cycle. Integration is commercially possible because of the closely matched thermodynamic conditions of the SOFC module output exhaust flow and the gas turbine inlet flow.

A variety of fuel cells used in power plant systems are described in the literature. For example, in U.S. Pat. No. 5,413,879 (Domeracki et al.) a SOFC is integrated into a gas turbine system. There, pre-heated, compressed air is supplied to a SOFC along with fuel, to produce electric power and a hot gas, which gas is further heated by combustion of unreacted fuel and oxygen remaining in the hot gas. This higher temperature gas is directed to a topping combustor that is supplied with a second stream of fuel, to produce a still further heated gas that is then expanded in a turbine.

A variety of fuel cell types, in various system configurations is also described by B. R. Gilbert et al. in "Fuel Cells Make Their CPI Moves", in *Chemical Engineering*, August 1995, pp. 92–96. Specifically, a conceptual design of a 1 MW commercial unit shows two molten carbonate fuel cell stacks and two associated reformers enclosed within a horizontal cylindrical vessel. The same concept is also reviewed by S. E. Keuhn in "Molten-Carbonate Fuel Cell Demonstrates its Commercial Readiness", Power Engineering, March 1995, p. 16.

U.S. Pat. Nos. 5,573,867 and 4,750,278 (Zafred et al. and Gillett et al. respectively) describe SOFC systems in pressure vessels. However, all these systems separate the fuel cells, in their pressure vessel, from the combustors, invertors, plant control systems, and turbine generators. Present pressurized solid oxide fuel cell generator/ gas turbine systems ("PFC/GT") consist of one or more of tubular fuel cells arranged in a pressure vessel together with a set of isolation and stack bypass valves and associated piping. The gas turbine's expander and compressor sections are located on a skid external to the generator pressure vessel. The expander driven compressor supplies process air to the fuel cell stacks through a recuperator and an SOFC generator inlet check valve. The SOFC's hot pressurized exhaust stream is expanded through the gas turbine's expander and is then used to preheat the air in the recuperator. Much of this is taught and shown in the Domeracki et al '879 patent.

There are several concerns with using small gas turbines (micro-turbines) as the air source for the fuel cell stack. Reliability of the gas turbine is a concern, as outages imply depressurization events and thermal cycles for the fuel cell. Further, the ability of the gas turbine to maintain a steady flow of air and maintain a steady pressure within the fuel cell in the event of fluctuating turbine inlet temperature is in question. With the cell stack(s) operating at pressure, any significant reduction in the air side pressure due to gas turbine speed fluctuations could result in the unwanted back flow of fuel gas in the fuel cells. Experiments have shown that even short exposures of the air electrodes to fuel can lead to failure of the fuel cells. Clearly, a major mechanical failure of the compressor or expander could lead to the depressurization of the vessel through the air inlet side with subsequent stack damage. Further, should depressurization occur through the fuel cell exhaust, then the gas turbine's expander can be subject to temperatures in excess of its capacity. To safeguard against these events, the SOFC/GT system typically has three valves incorporated into the piping. An SOFC generator inlet check valve is provided to prevent the unwanted back flow of fuel gas through the air inlet piping during a pressure excursion. A bypass line and valve may be provided around the stack(s) to both modulate the airflow to the stack and to aid in starting the turbine. Finally a valve is placed in the SOFC generator exhaust piping to control the depressurization of the SOFC generator through the gas turbine expander. These valves, carrying hot gases and typically located in the hot surroundings within the pressure vessel are very expensive and difficult to maintain. The cost of this equipment may be excessive, making eventual commercialization of this approach questionable. What is needed is an alternate arrangement of the above mentioned components to increase the reliability and reduce the cost of the total system.

SUMMARY OF THE INVENTION

Therefore it is a main object of this invention to provide a pressurized fuel cell "PFC"—turbine generator "GT" (PFC/GT) system inside a common pressure vessel which will be applicable to any pressurized PFC/GT hybrid cycle power plant.

The system will comprise a plurality of fuel cells having associated oxidant feed supply and fuel feed supply, a gas turbine compressor to pressurize oxidant for the fuel cells, and a gas turbine expander to receive hot pressurized exhaust from the fuel cells, all located within a single pressure boundary. This single pressure boundary will usually be a single pressure vessel but it can also be two or more vessels interconnected by other vessels or pipes of smaller characteristic diameter. A combustor may be needed for startup and can also be used to further pre-heat hot pressurized fuel cell exhaust prior to entry into the gas turbine expander. Preferably, the pressure boundary/vessel will be positioned horizontally. It will be separated into two compartments separated by a thermal barrier that restricts the heat flow from the PFC side to the supporting equipment side which includes the gas turbine generator, in order to use standard materials and designs for the gas turbine generator. In this system, the fuel cell exhaust temperature is lowered by turbine expansion and by recuperation which heats oxidant; where oxidant and fuel isolation valves operate at ambient temperature; and where the exhaust isolation value operates at a lower temperature than the exhaust temperatures in the pressure vessel.

The primary advantages of such a PFC/GT positioned inside a common pressure vessel include: the risk of SOFC stack damage or turbine expander damage due to unexpected depressurizations is reduced, the concept can be extended to any high temperature fuel cell employing a gas turbine in a hybrid cycle power system, the pressure vessel length can be readily extended to provide additional capacity by adding additional fuel cell stacks. Also, by placing the gas turbine within the pressure boundary/vessel, the interconnecting piping between fuel stacks or modules and the gas turbine and compressor will not pass through or be a part of the pressure boundary and so are governed by less restrictive design constraints. Preferably the system will use tubular solid oxide fuel cells.

BRIEF DESCRIPTION OF THE DRAWINGS

For a better understanding of the invention, reference may be made to the accompanying drawing, which is a cross-sectional view of the total pressurized PFC/GT of this invention.

DESCRIPTION OF THE PREFERRED EMBODIMENTS

Referring now to the drawing, a combined PFC/GT is shown as 10. This includes a single continuous pressure boundary 12, most usually a single pressure vessel, which surrounds all the system components. The pressure vessel internal space is divided by a thermal insulating partition or barrier 16 forming a PFC compartment 18 and a GT compartment 20. The pressure within both compartments is the same, typically about 3 atmospheres (45 pound/sq. inch). The fuel cell space surrounding the PFC in compartment 18 will generally operate at temperatures over about 600° C. and up to about 1000° C. The thermal insulating barrier 16 will control and restrict heat flow from compartment 18 to compartment 20 so that the temperature in GT compartment 20 will always be significantly lower than the temperature in the PFC compartment except at startup. The PFC compartment 18 can contain one or more fuel cell systems or modules 22 each employing very large or multiple fuel cell stacks disposed on insulated supports 24. Also included in compartment 18 would be other associated structural supports, insulation, piping, and electrical connections.

GT compartment 20 will contain the turbomachinery, that is, startup combustor 40, turbine expander 26 and turbine compressor 28, startup duct burner 30 to further heat compressed pre-heated air or oxidant, fed by line 32, which passes to the fuel cell systems or modules 22. The turbine 26 receives hot exhaust gas from the fuel cell systems, which hot exhaust gas passes by line 38 first to the startup combustor 40 then feeding into and driving turbine 26. The turbine exhaust passes through the recuperator preheating the compressor discharge air, and then exits through exterior valve 42 as system exhaust 44. Other components in GT compartment 20 include alternator 46 and a heat removal system 48 feeding to a radiator (not shown) for helping to cool the GT compartment 20.

Outside the single pressure vessel 12 are air or oxidant inlet 50 controlled by exterior valve 52 and fuel inlet 54 controlled by exterior valve 56. Horizontal axis of the system is shown as x—x. Thus oxidant enters the system through valve 52, passes to compressor 28, recuperator 34, startup burner 30 and to the fuel cells via line 58. Fuel enters the system through valve 56 and flows to the fuel cells via line 36. Fuel cell exhaust passes via line 38 to the startup combustor 40, then to the turbine 26 then through the recuperator 34 to heat the incoming air or oxidant and exits as 44 via external valve 42. The generator associated/connected to with the turbine may be outside the pressure boundary with a rotating shaft pressure seal on the shaft between turbine and generator or a magnetic coupling to transmit torque through the pressure boundary.

As shown in the drawing, oxidant and fuel inlet, and exhaust line isolation valves, 52, 56 and 42 respectively, are located outside the pressure vessel rather than in the vessel. These valves can be used to limit the rate of depressurization should a failure occur in the turbomachinery or internal piping. Because the isolation valves are outside the vessel, they are easily accessible for maintenance, and are located in cool surroundings, and pass cooler gas which allows for high reliability and low cost. The inlet valves will operate at ambient temperature, and the exhaust valve will operate at the recuperator 34 exhaust exit temperature (about 300° C.). This will very substantially reduce the cost of these components since there should be no need for exotic high temperature alloys. In some instances in certain designs oxidant/air inlet isolation valve and/or the exhaust line isolation valve, need not be required. The heat removal system 48 may be employed within the equipment side of the vessel to remove the heat loads from bearings, the turbine, the generator or alternator, and the other components requiring cooling. One simple system that may be used employs two small penetrations to carry a liquid coolant into and out of the vessel. This coolant is then routed to heat exchanger(s) in the GT compartment 20 designed to remove the above heat loads. The coolant then rejects heat via a simple radiator system. An alternate method for removing the heat loads would be to continuously bleed air from the compressor into the equipment side of the vessel and vent it into the exhaust line exiting the pressure vessel, effectively creating a continuous purge system.

The system provides:
1) a system where the fuel cells and turbine generator are inside the pressure vessel and the depressurization protection, that is, isolation valves are outside the pressure vessel;
2) low temperature oxidant, fuel and exhaust isolation valves located outside the pressure vessel, which lead to low cost and high reliability, and
3) use of a thermal barrier, and heat removal from the turbine generator compartment to protect equipment.

What is claimed is:
1. A pressurized fuel cell-turbine generator system, the system comprising a plurality of fuel cells having associated oxidant feed supply and fuel feed supply, a gas turbine compressor to pressurize oxidant for the fuel cells, and a gas turbine expander to receive hot pressurized exhaust from the fuel cells, all located within a single pressure boundary.

2. The pressurized system of claim 1, where exhaust exits the system and isolation valves for oxidant feed supply, fuel feed supply and exhaust exit are outside the pressure boundary.

3. The pressurized system of claim 1, where exhaust exits the system and isolation valves for oxidant feed supply, fuel feed supply and exhaust exit are outside the pressure boundary, where the fuel cell exhaust temperature is lowered by turbine expansion and by recuperation which heats oxidant, and where the oxidant and fuel isolation valves operate at ambient temperature and the exhaust isolation valve operates at a lower temperature than the exhaust temperatures within the pressure vessel.

4. The pressurized system of claim 1, wherein the fuel cells are separated from said compressor and said expander by an insulating partition, said partition forming a fuel cell compartment and a turbine generator compartment within said pressure boundary.

5. The pressurized system of claim 1, where pressurized exhaust exits the system and isolation valves for oxidant feed supply, fuel feed supply and pressurized exhaust exit are outside the pressure boundary, where said pressure boundary includes a fuel cell compartment and a turbine generator compartment, and where the temperature in the turbine generator compartment will be lower than the temperature in the fuel cell compartment in order to use standard materials and designs for the gas turbine generator.

6. The pressurized system of claim 1, containing means to heat the oxidant feed prior to entry into the fuel cells.

7. The pressurized system of claim 1, where the fuel cells are solid oxide fuel cells.

8. The pressurized system of claim 1, where the fuel cells are tubular solid oxide fuel cells.

9. The pressurized system of claim 1, where the pressure boundary is a single pressure vessel.

10. The pressurized system of claim 1 where a generator is associated with the turbine.

11. The system of claim 3 where oxidant passes to the compressor, then through the recuperator before entering the fuel cells.

12. The pressurized system of claim 11, wherein said pressure boundary includes a fuel cell compartment and a turbine generator compartment, and where a heat removal system is also contained within the pressure boundary to cool the turbine generator compartment.

* * * * *